(12) United States Patent
Seetharaman et al.

(10) Patent No.: US 10,020,985 B2
(45) Date of Patent: Jul. 10, 2018

(54) SYSTEM AND METHOD FOR EFFECTIVE AND RELIABLE LAWFUL INTERCEPTION CONTENT TRANSMISSION ACROSS NETWORKS

(71) Applicant: Wipro Limited, Bangalore (IN)

(72) Inventors: Swaminathan Seetharaman, Chennai (IN); Venkata Subramanian Jayaraman, Chennai (IN)

(73) Assignee: Wipro Limited, Bangalore (IN)

( * ) Notice: Subject to any disclaimer, the term of this patent is extended or adjusted under 35 U.S.C. 154(b) by 157 days.

(21) Appl. No.: 14/942,558

(22) Filed: Nov. 16, 2015

(65) Prior Publication Data

US 2017/0093614 A1    Mar. 30, 2017

(30) Foreign Application Priority Data

Sep. 29, 2015   (IN) .......................... 5211/CHE/2015

(51) Int. Cl.
*H04L 12/24*    (2006.01)
*H04L 12/703*   (2013.01)
*H04L 12/26*    (2006.01)

(52) U.S. Cl.
CPC ...... *H04L 41/0668* (2013.01); *H04L 43/0847* (2013.01); *H04L 45/28* (2013.01)

(58) Field of Classification Search
CPC .. H04L 41/0668; H04L 43/0847; H04L 45/28
See application file for complete search history.

(56) References Cited

U.S. PATENT DOCUMENTS

| | | | |
|---|---|---|---|
| 5,809,148 A * | 9/1998 | Doberstein | H04L 9/0637 380/262 |
| 8,533,588 B2 | 9/2013 | Schneider et al. | |
| 2009/0279432 A1* | 11/2009 | Solis | H04M 3/2281 370/235 |
| 2011/0314177 A1* | 12/2011 | Harp | H04L 63/306 709/238 |
| 2015/0049613 A1* | 2/2015 | D'Amora | H04L 47/11 370/235 |
| 2016/0087809 A1* | 3/2016 | Schmidt | G06F 17/30958 370/390 |
| 2016/0164775 A1* | 6/2016 | Marfia | H04L 63/306 370/230.1 |

* cited by examiner

*Primary Examiner* — Un C Cho
*Assistant Examiner* — Jeremy Costin
(74) *Attorney, Agent, or Firm* — LeClairRyan PLLC

(57) ABSTRACT

A session continuity server controller, the controller comprising: a memory; and a processor coupled to the memory storing processor executable instructions which when executed by the processor causes the processor to perform operations comprising: determining one or more defects in lawful interception content transmission associated with a user session, wherein the one or more defects comprise one or more degraded network conditions and degraded LI content; executing one or more corrective measures based on the one or more defects in lawful interception content transmission; and determining stability of the lawful interception content transmission post one or more corrective measures for effective and reliable lawful interception content transmission.

20 Claims, 4 Drawing Sheets

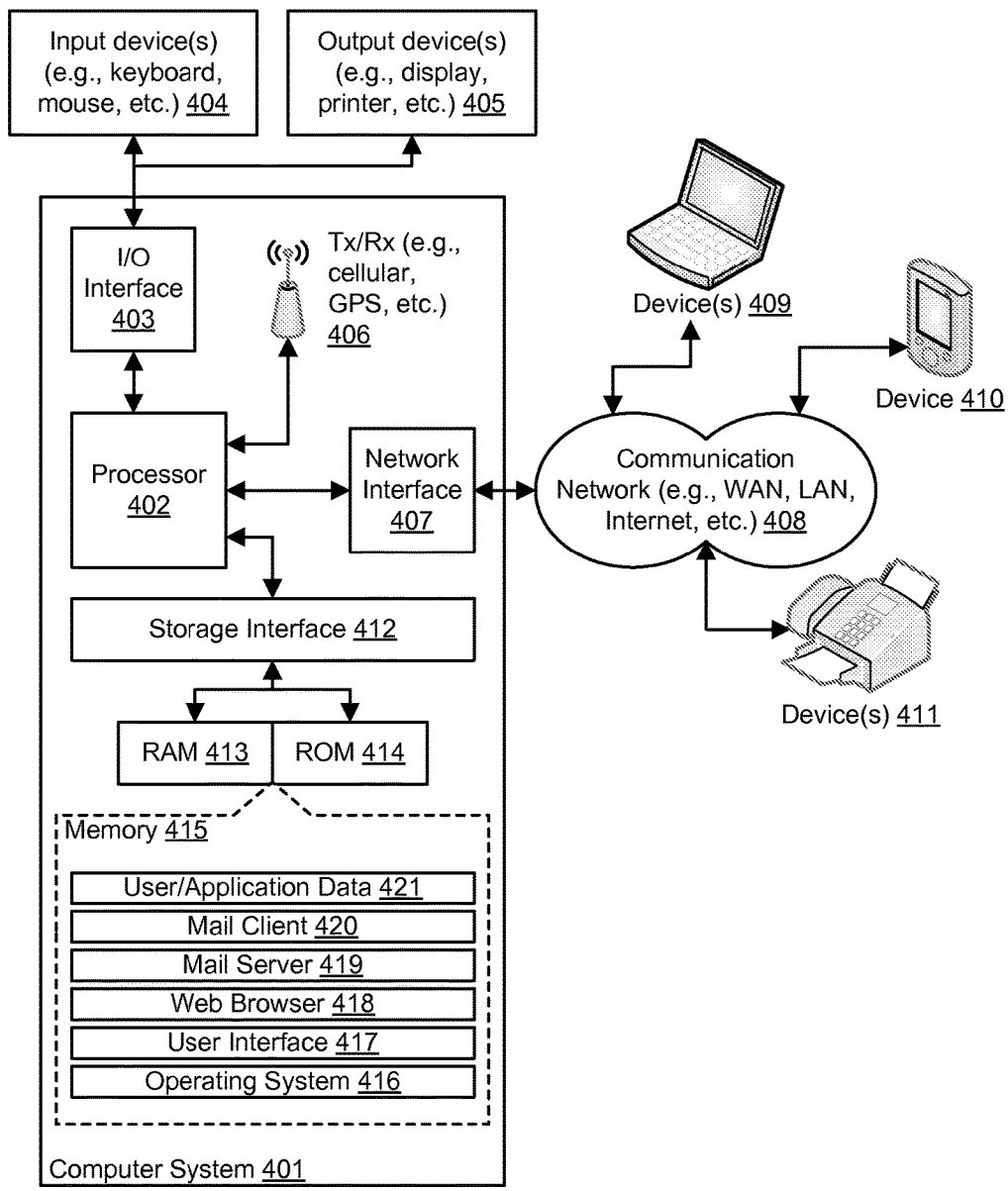
FIG. 4: Example Computer System

SYSTEM AND METHOD FOR EFFECTIVE AND RELIABLE LAWFUL INTERCEPTION CONTENT TRANSMISSION ACROSS NETWORKS

This application claims the benefit of Indian Patent Application Serial No. 5211/CHE/2015 filed Sep. 29, 2015, which is hereby incorporated by reference in its entirety.

FIELD

This disclosure relates generally to lawful interception (LI), and more particularly to System and Method for effective and reliable Lawful Interception content transmission across networks.

BACKGROUND

Typically during lawful interception (LI), there may be a content duplication failure. The content duplication failure may be due to buffer-overflow, insufficient network resources. This may lead to failure in sending content-packet, or sending defective content-packet to the Law Enforcement Agency (LEA). Typically during lawful inception, content aggregation may be performed. Content aggregation may be aggregation of one or more data packets duplicated for lawful interception. Content aggregation may fail due to buffer-overflow, insufficient resources. This may lead to failure in sending content-packet, or sending defective content-packet to the Law Enforcement Agency (LEA).

Typically during lawful inception, content delivery may be performed. Content delivery may be delivery of the one or more data packets to the LEA. Content delivery may also fail due to delay in transmission due to insufficient resources. Quality and reliability of the LI may have an impact due to such failures.

SUMMARY

A method for effective and reliable lawful interception content transmission across one or more networks, the method comprising: determining, by a session continuity server controller, one or more defects in lawful interception content transmission associated with a user session, wherein the one or more defects comprise one or more degraded network conditions and degraded lawful interception content; executing, by the session continuity server controller, one or more corrective measures based on the one or more defects in lawful interception content transmission; and determining, by the session continuity server controller, stability of the lawful interception content transmission post one or more corrective measures for effective and reliable lawful interception content transmission.

A session continuity server controller, the controller comprising: a memory; and a processor coupled to the memory storing processor executable instructions which when executed by the processor causes the processor to perform operations comprising: determining one or more defects in lawful interception content transmission associated with a user session, wherein the one or more defects comprise one or more degraded network conditions and degraded LI content; executing one or more corrective measures based on the one or more defects in lawful interception content transmission; and determining stability of the lawful interception content transmission post one or more corrective measures for effective and reliable lawful interception content transmission.

It is to be understood that both the foregoing general description and the following detailed description are exemplary and explanatory only and are not restrictive of the technology, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 4 is a block diagram of an exemplary computer system for implementing embodiments consistent with the present disclosure.

DETAILED DESCRIPTION

Figure 1:
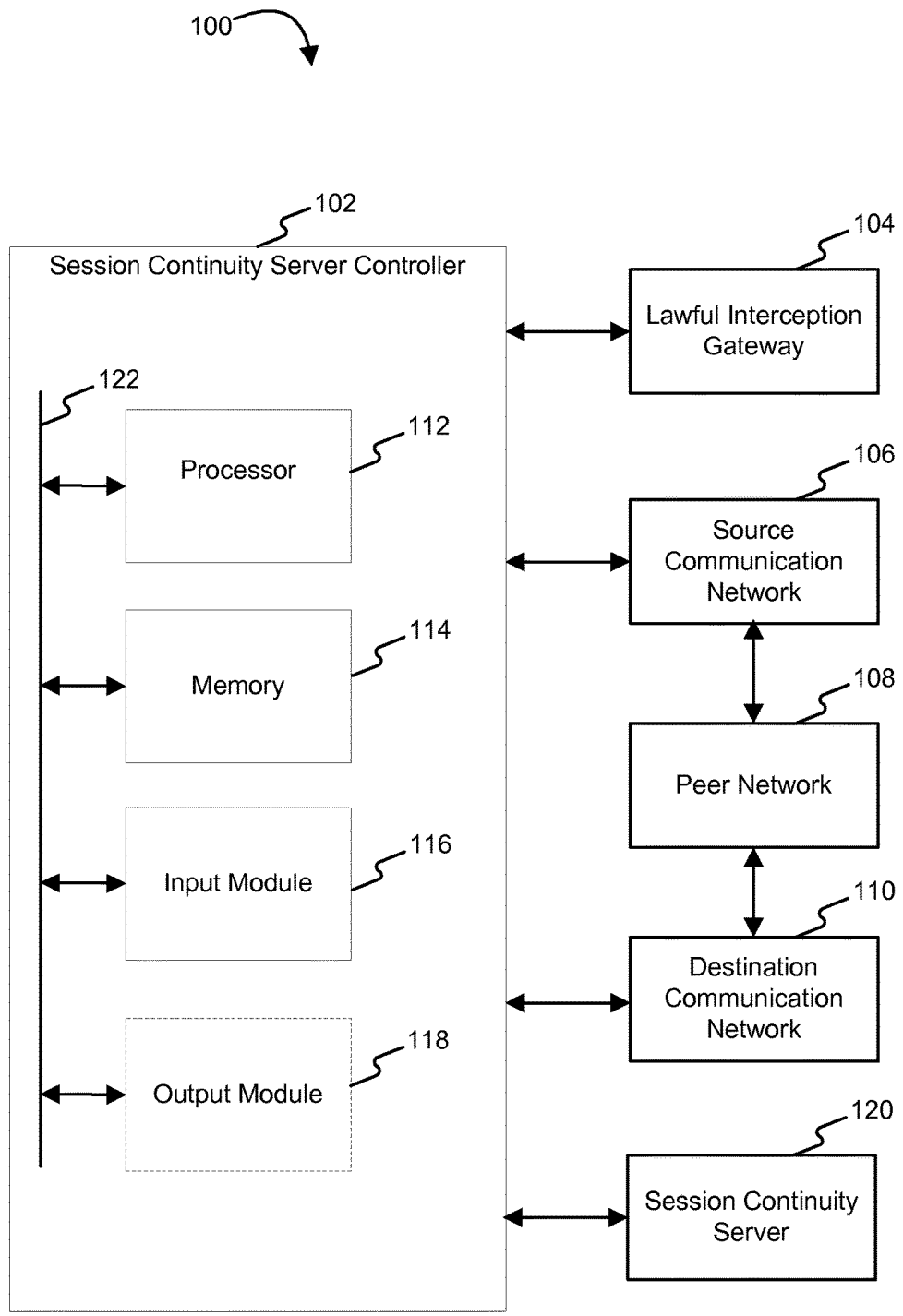
FIG. 1 illustrates an exemplary block diagram for an environment for effective and reliable LI content transmission across networks in which various embodiments of the present disclosure may function.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The exemplary environment 100 may include a session continuity server controller (SCSC) 102, a lawful interception gateway (LIG) 104, a source communication network 106, a peer network 108, a destination communication network 110 and an session continuity server (SCS) 120. While not shown, the exemplary environment 100 may include additional components, such as database etc which are well known to those of ordinary skill in the art and thus will not be described here. The SCSC 102 may initiate continuous lawful interception of an ongoing voice and data session across one or more communication networks by the session continuity server 120 ensuring optimal use of network resources. The session continuity server (SCS) 120 may ensure optimal use of network resources during continuous lawful interception of an ongoing voice and data session across one or more communication networks The session continuity server controller (SCSC) 102 may further include at least one processor 112, a memory 114, an input module 116, and an output module 118, which may be coupled together by bus 122. The input module 116 may receive routing policies provisioned by a law enforcement agency and one or more communication network properties. The output module 118, may link the SCSC 102 with peripheral network components such as session continuity server (SCS) 120, the source communication network 106 and the destination communication network 110.

Processor(s) 112 may execute one or more computer-executable instructions stored in the memory 114 for the methods illustrated and described with reference to the examples herein, although the processor(s) can execute other types and numbers of instructions and perform other types and numbers of operations. The processor(s) 112 may comprise one or more central processing units ("CPUs") or general purpose processors with one or more processing cores, such as AMD® processor(s), although other types of processor(s) could be used (e.g., Intel®).

The memory 114 may comprise one or more tangible storage media, such as RAM, ROM, flash memory, CD-ROM, floppy disk, hard disk drive(s), solid state memory, DVD, or other memory storage types or devices, including combinations thereof, which are known to those of ordinary skill in the art. The memory 114 may store one or more non-transitory computer-readable instructions of this technology as illustrated and described with reference to the examples herein that may be executed by the one or more processor(s) 112.

Figure 2:
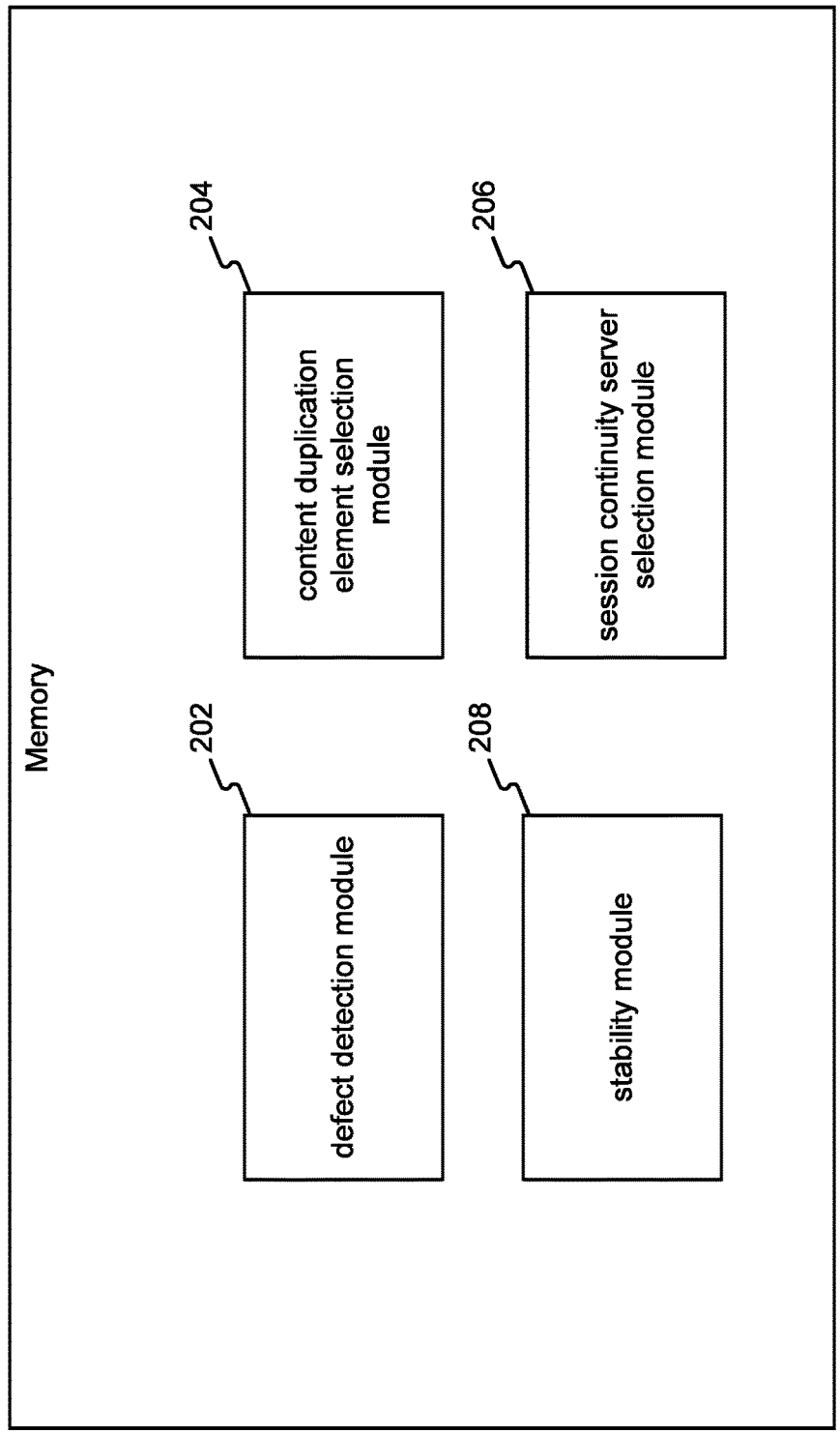
FIG. 2 illustrates memory which may include defect detection module, content duplication element selection module, session continuity server selection module and stability module.

FIG. 2 illustrates the memory 114 which may include defect detection module 202, content duplication element selection module 204, session continuity server selection module 206 and stability module 208. The defect detection module 202 may determine one or more defects in lawful interception content transmission associated with one or more user session, wherein the one or more defects comprise one or more degraded network conditions and degraded lawful interception content. The defect detection module 202 may detect the one or more degraded network conditions and the degraded lawful interception content.

The one or more degraded network conditions may lead to one or more defective lawful interception events. The one or more defective lawful interception events may be missing SCS 120 heartbeat wherein the heartbeat is associated with the SCS 120 being active and functional, SCS 120 reporting failure of content duplication due to non-receipt of media and signaling content from a content duplication element, delay in reception of LI content and corruption of LI content during transmission.

The content duplication element may be one or more communication network elements capable of performing content duplication. The one or more degraded network conditions may be due to increased congestion associated with one or more communication network and decreased processing capacity associated with the one or more communication network elements. The processing capacity may be associated with computing resources such memory, storage space and processor core occupancy.

The one or more degraded network conditions are determined based on a pre-defined network condition threshold and an applicable network condition threshold. The pre-defined network condition threshold may be provisioned from LEA. The LEA may provision the pre-defined network condition threshold based on anticipated impact of the network conditions on LI continuity. For example Table A may illustrate processing capacity level threshold corresponding to procession and memory occupancy. Table B may illustrate congestion level threshold corresponding to congestion associated with the one or more communication network.

TABLE A

| Processing capacity level threshold | Processor memory occupancy |
|---|---|
| Level 1 | >=50%, <=70% |
| Level 2 | >70%, <=85% |
| Level 3 | >85% |

TABLE B

| Congestion level threshold | Congestion (measured based on queue length, delay for acknowledgement) |
|---|---|
| Level 1 | >=50%, <=70% |
| Level 2 | >70%, <=85% |
| Level 3 | >85% |

The applicable network condition threshold may be a threshold value associated with one or more degraded network conditions which needs to be maintained for effective and reliable lawful interception content transmission. The applicable network condition threshold (ANCT) may be determined based on correlation of historical congestion levels and historical processing capacity levels, with historical occurrence of the one or more defective LI events. For example, when processing capacity level may be 83% and congestion level may be 83% the one or more defective LI events may be recorded at 70 occurrences per minute.

During at least one of lawful interception initiation or content duplication function handover, the defect detection module 202 may determine the applicable network condition threshold. Post initiation of lawful interception for one or more target users, the defect detection module 202 may receive network condition reports from the content duplication element if the applicable network condition threshold (ANCT) is crossed.

During handover of the content duplication function the defect detection module 202 may receive network condition reports from the SCS 120. Upon receiving one or more network condition reports, the defect detection module 202 may confirm detection of one or more degraded network conditions.

The defect detection module 202 may determine degraded LI content based on a pre-defined content quality threshold, actual network path length, link availability factor, link quality factor. The predefined content quality threshold (PCQT) may be determined based on number of headers frames, decryption time, data packet transmission delays and data packet retransmissions. The predefined content quality threshold may be provisioned by the LEA. The PCQT may be applicable to one or more communication network under jurisdiction of the LEA. The LEA may also provision a time interval for periodic check of content quality across the content duplication element and the SCS 120. The periodic check of content quality may be indexed as content quality index (CQI). The time interval for periodic check may be in range of 2 to 5 minutes.

An applicable content quality threshold (ACQT) may be a threshold value associated with quality of the lawful interception content below which effective and reliable lawful interception content transmission is not possible. The applicable content quality threshold (ACQT) may be associated with SCS 120 as well as the CDE. The SCS 120 and the CDE may determine separate ACQT associated with the degraded LI content. The ACQT may be associated with the CDE during lawful interception initiation. The ACQT may be associated with the SCS 120 during a handover of user session form the source network 106 to the destination communication network 110. The ACQT may be sent to the CDE during the lawful interception initiation by the SCSC 102. The ACQT may be sent to the SCS 120 by the SCSC 102, during a handover of user session form the source network 106 to the destination communication network 110. The applicable content quality threshold (ACQT) may be determined based on pre-defined content quality threshold, actual network path length, link availability factor, link quality factor.

ACQT=PCQT*(actual network path length for LI/average path length for LI)*link availability factor*link quality factor The actual network path length may be at least one of physical distance between the content duplication element and the SCS 120 or physical distance between the LIG 104 and the SCS 120. The link availability factor may be at least one of status of connection between the content duplication element and the SCS 120 or status of connection between the LIG 104 and the SCS 120. The link quality factor may be associated with at least one of properties of physical channel between the content duplication element and the SCS 120 or properties of physical channel between the LIG 104 and the SCS 120. For example

TABLE C

| Link Availability Factor | Link Availability Between SCS And LIG |
|---|---|
| 1 | >=99.999% |
| 0.9 | >=99% and <99.999% |
| 0.7 | >=90% and <99% |
| 0.5 | >=80% and <90% |
| 0.2 | <80% |

As given in Table C, Link Availability Factor may be equal to 1 if the link availability between SC server 120 and LIG 104 is greater than or equal to 99.999%. Link Availability Factor may be equal to 0.9 if the link availability between SC server 120 and LIG 104 is greater than or equal to 99% but less than 99.999%. Link Availability Factor may be equal to 0.7 if the link availability between SC server 120 and LIG 104 is greater than or equal to 90% and less 99%. Link Availability Factor may be equal to 0.5 if the link availability between SC server 120 and LIG 104 is greater than or equal to 80.0% but less than 90%. Link Availability Factor may be equal to 0.2 if the link availability between the SCS 120 and the LIG 104 is less than 80%. The link availability information may be provided by the LIG 104 and stored internally in the SCSC 102.

The link quality factor may be determined based on number of packets retransmissions per second due to packet corruption. For example

TABLE D

| Link Quality Factor | Number Of Retransmissions/Second Between SCS And LIG |
|---|---|
| 1 | <'a' |
| 0.7 | >='a', and <'b' |
| 0.3 | >='b' |

As given in Table D, the number of retransmissions per second from the SCS 120 to the LIG 104 due to packet corruption may be provided by the LIG 104 to the SCSC 102.

Let 'a' and 'b' be pre-configured range denoting the number of packets retransmission per second.

The Link Quality Factor may be equal to 1 if number of retransmissions per second from the SCS 120 to the LIG 104 due to packet corruption is less than 'a'. The Link Quality Factor may be equal to 0.7, if number of retransmissions per second from the SCS 120 to LIG 104 due to packet corruption is greater than or equal to 'a', and less than 'b'. The Link Quality Factor may be equal to 0.3 if number of retransmissions per second from the SCS 120 to the LIG 104 due to packet corruption is greater than or equal to 'b'.

So if the PCQT is 5 and actual network path length for LI/average path length for LI is 1.5, link availability factor is 1 and link quality factor is also 1 then the ACQT may be 7.5.

Once the ACQT is determined for the SCS 120 and the CDE, the SCSC 102 then may provide the respective ACQT values to the SCS 120 and the CDE. The SCSC 102 may provide a provisioned value for one or more 'observation windows' (OWS) which may be used by the CDE and the SCS 120 as explained below.

The ACDE and the SCS 120 may dynamically compute the CQI periodically (e.g., once every 2 minutes), and send a report to the SCSC 102 if the CQI value is lower than the ACQT value received from the SCSC for OWS consecutive time intervals. The time interval for periodic check of content quality across the CDE and the SCS 120 may be provisioned from the LEA.

The CQI may be is dynamically computed as follows:

CQI=Header Index+Delay Index+Retransmission Index+Encryption Index

TABLE E

| Header Index | Number of internal transport or higher layer headers |
|---|---|
| 1 | 0 |
| 0.7 | 1 to 2 |
| 0.4 | More than 2 |

For example as given in Table E

Header Index may be equal to 1 if no internal transport or higher layer headers are present. Header Index may be equal to 0.7 if 1 or 2 internal transport or higher layer headers are present. Header Index may be equal to 0.4 if more than 2 internal transport or higher layer headers are present. Let 'x' and 'y' be pre-configured range in seconds denoting the round trip time (RTT) delay.

TABLE F

| Delay Index | Packet Round Trip Delay (x' and 'y' are pre-configured) |
|---|---|
| 1 | <'x' seconds |
| 0.7 | >='x' seconds, <'y' seconds |
| 0.4 | >='y' seconds |

Delay Index may be equal to 1 if LI packet round trip delay is less than 'x' seconds. Delay Index may be equal to 0.7 if LI packet round trip delay is greater than 'x' seconds, but less than 'y' seconds. Delay Index may be equal to 0.4 if LI packet round trip delay is greater than 'y' seconds. Let 'c' and 'd' be pre-configured range denoting the number of packet retransmission due to time out or packet drop. Let MF be a pre-configured Multiplication Factor.

Retransmission Index may be equal to 1, if number of retransmissions per second*MF is less than 'c'. Retransmission Index may be equal to 0.7, if number of retransmissions/second*MF is greater than or equal to 'c', but is less than 'd'. Retransmission Index may be equal to 0.3, if number of retransmissions/second*MF is greater than equal to 'd'.

Encryption Index may be equal to 1 if the one or more user session is unencrypted. Encryption Index may be equal to 1 if the one or more user session is encrypted but if no decryption is done at the CDE or SCS 120. Encryption Index may be equal to 0.9 if decryption is done at the CDE or SCS 120 and more than 40% of spare network resources are available at the CDE or SCS 120 where the decryption is done. Encryption Index may be equal to 0.6 for all other cases.

So if Header Index is 1 and Delay Index is 1 and Retransmission Index is 1 and Encryption Index is 1, then CQI may be 4.

Once the CQI is determined, the CQI may be compared with the ACQT. If the CQI value is lower than the CQT value received from the SCSC for periodic check for OWS consecutive observation windows, the quality of the lawful interception content may be considered as degraded.

Once the one or more defects are detected, one or more corrective measures may be executed by the session continuity server controller (SCSC) 102 based on the one or more defects in lawful interception content transmission. The one or more corrective measures may comprise at least one of selection of a new content duplication element and selection of a new session continuity server. The selection of the new content duplication element may be determined based on content duplication element action level (CDEAL). The CDEAL may be determined based on processing capacity associated with the content duplication element and congestion level associated with the content duplication element.

Content Duplication Element Action Level=Processing Capacity+Congestion Level Congestion level associated with the content duplication element may be reported to SCSC 102 by the one or more communication network. The processing capacity associated with content duplication element may be reported to the SCSC 102 by the one or more communication network. Based on the content duplication element action level, a content duplication element selection module 204, may determine selection of the new content duplication element.

For example

TABLE G

| CDEAL | Actions |
| --- | --- |
| 0 | no actions |
| 1-2 | Do no actions for present user session, but ensure that the ACDE is not selected as much as possible, say, for more than 'n' new user sessions in addition ('n' can be pre-configured) |
| 3 | Do no immediate actions for present user session, but ensure that the ACDE is not selected as much as possible for any new user sessions |
| >3 | selection of the new content duplication element |

If the CDEAL is 0, the content duplication element may not change. If the CDEAL is between or equal to 1 or 2, the content duplication element may not change for a user session, but the content duplication element may not be used for more than a pre-defined number of new or additional user sessions. If the CDEAL is 3, the content duplication element may not change for the present user session, but the content duplication element may not be selected for any new or additional user sessions. If the CDEAL is above 3, then a new content duplication element may be selected for the ongoing user session. The new content duplication element may be selected only if following conditions are met: one or more degraded network conditions don't exist across more than 50% of one or more content duplication element and the new content duplication element was not selected for a user session for a preconfigured "m" seconds due to one or more degraded network conditions across the one or more content duplication elements. In an exemplary embodiment, the content duplication element selection module 204 may select the new content duplication element for "i" user sessions. The number of user sessions 'i' may be determined by the actual load level, based on processing capacity and congestion level associated with the new content duplication element. For example $$i = \frac{\text{Maximum [(Congestion level} - 85\%), 1]}{[\text{processing capacity per target user for Lawful Interception}]}$$

The degradation in the LI content may be detected by the defect detection module 202. The SCSC controller 102 may then check one or more reasons for LI content degradation. The number of retransmissions or delay in transmission of LI content packets may have exceeded the Content Quality Threshold. The SCSC 102 may determine last computed content duplication element action level. For example, if the CDEAL is less than 2 no action is taken by the SCSC 102, if the CDEAL is greater than or equals to 2 the new content duplication element may be selected. The new content duplication element may be selected only if following conditions are met: one or more degraded network conditions don't exist across more than 50% of one or more content duplication element and the new content duplication element was not selected for a user session for a preconfigured "m" seconds due to one or more degraded network conditions across the one or more content duplication elements. If the new content duplication element doesn't comply with the content duplication format or session characteristics of the one or more user sessions provisioned by the LEA, then content duplication element selection module 204 may select an appropriate content duplication element to comply with the content duplication format or session characteristics provisioned by the LEA.

If a timeout occurs before a confirmation is received from the SCS 120 that the content duplication element handover was successful, or if a failure indication is received from the SCS 120 for the content duplication element handover then the content duplication element may not be selected in future for lawful interception content duplication.

After selecting a new content duplication element, the content duplication element selection module 204 may trigger the defect detection module 202 for determining the applicable content quality threshold and applicable network condition threshold values associated with the new content duplication element. The content duplication element selection module 204, then may update the SCS 120 with the applicable content quality threshold and applicable network condition threshold values associated with the new content duplication element. Upon receiving the applicable content quality threshold and applicable network condition threshold values associated with the new content duplication element, the SCS 120 may instruct content duplication function hand over to the new content duplication element, and also pass the applicable content quality threshold and applicable network condition threshold values to the new content duplication element.

The one or more corrective measures may comprise at least one of selection of a new content duplication element and selection of a new session continuity server, SCS 120. The selection of the new SCS 120, may be based on session continuity server action level (SCSAL). The SCSAL may be determined based on processing capacity associated with the session continuity server 120 and congestion level associated with the session continuity server 120.

SCS Action Level=Processing Capacity Level+Congestion Level

Congestion level associated with the session continuity server (SCS) 120 and the processing capacity associated with the session continuity server (SCS) 120 may be reported to SCSC 102 by the one or more communication network. Based on the SCSAL, a session continuity server selection module 206, may determine selection of the new SCS 120. For example

TABLE H

| SCSAL | Actions |
|---|---|
| 0 | no actions |
| 1-2 | Do no actions for present user session, but ensure that the SCS is not selected as much as possible, say, for more than 'n' new user sessions in addition ('n' can be pre-configured) |
| 3 | Do no immediate actions for present user session, but ensure that the SCS is not selected as much as possible for any new user sessions |
| >3 | selection of the new session continuity server may be initiated |

If the SCSAL is 0 or less than 1, then no action may be required. If the SCSAL is between 1 to 2, the new SCS 120 may not be selected, but the previous SCS 120 is not selected for more than a pre-defined number of new or additional user sessions. If the SCSAL is 3, the SCS 120 may not change for the present user session, but may not be selected for any new or additional user sessions. If the SCSAL is above 3, then the new SCS 120 may be selected for the ongoing user session. The new SCS 120 may be selected only if: one or more degraded network conditions don't exist across more than 50% of one or more SCS and the new SCS was not selected for a user session for a preconfigured "r" seconds due to one or more degraded network conditions across the one or more content duplication elements. In an exemplary embodiment "r" can be based on a pre-configured value that is dynamically adjusted by the SCSC 102 depending on the distance between SCS 120 and SCSC 102, and the network congestion level. In an exemplary embodiment, the session continuity server selection module 206 may select the new SCS for "k" user sessions. The number of user sessions 'k' may be determined by the actual load level, based on processing capacity and congestion level associated with the new SCS. For example $$k = \frac{\text{Maximum [(Congestion level} - 85\%), 1]}{[\text{processing capacity per target user for Lawful Interception}]}$$

The degradation of LI content may be detected by the defect detection module 202. Then the SCSC controller 102 may check one or more reasons for LI content degradation. The number of retransmissions or delay in transmission of LI content packets may exceed Content Quality Threshold. The SCSC 120 may determine last computed SCSAL. For example, if the SCSAL is less than 2 no action is taken by the SCSC 120, If the SCSAL is greater than or equal to 2 the new session continuity server may be selected. If the new SCS doesn't comply with the content duplication format or session characteristics of the one or more user sessions provisioned by the LEA, then session continuity server selection module 206 may select an appropriate SCS to comply with the content duplication format or session characteristics provisioned by the LEA.

The selection of the new SCS may be triggered, when SCS heartbeat is missed by the SCSC 102. The defect detection module 202 may detect the SCS heartbeat periodically. If a timeout occurs before a confirmation is received from a new SCS that a session continuity server handover was successful, or if a failure indication is received from the new SCS for the session continuity server handover then the session continuity server may not be selected in future for lawful interception.

After selecting a new session continuity server, the session continuity server selection module 206 may trigger the defect detection module 202 for determining the applicable content quality threshold and the applicable network condition threshold values associated with the new session continuity server. The session continuity server selection module 206, may update the new SCS 102 with the applicable content quality threshold and applicable network condition threshold values associated with the new SCS.

After executing the one or more corrective measures, the session continuity server controller 102 may determine stability of the lawful interception content transmission at step 304. Post the handover of content duplication element and session continuity server SCS 120, the stability module 208 may ensure stability of the lawful interception content transmission. The stability module 208 may ensure that the Lawful interception is seamlessly continued after executing one or more corrective measure.

The stability module 208 may ensure that the new content duplication element and the previous session continuity server exchange media and signaling information associated with the lawful interception content transmission to ensure Lawful Interception is seamless. The SCSC may inform the SCS 120 regarding the selection of the new content duplication element. The SCS 120 may send instructions to the previous content duplication element for lawful interception content duplication function handover. As part of the content duplication function handover process, the SCS server 120 may instruct the new content duplication element to initiate Lawful Interception for the target user. The stability module 208 may wait for a pre-configured time period to receive a confirmation message from the SCS that the system has reached a stable state.

The stability module 208 may ensure that the new session continuity server and the previous session continuity server exchange media and signaling information associated with the lawful interception content transmission to ensure Lawful Interception is seamless. The stability module 208 may, inform the previous session continuity server about the session continuity server handover. Upon receiving the information, the previous session continuity server may mark last signaling and media content sent to the LIG 104. The stability module 208 may, inform the previous session continuity server about the session continuity server handover. Upon receiving the information, the new session continuity server may initiate receiving media and signaling content from the new content duplication element.

The new session continuity server may also receive the media and signaling content last sent to the LIG 104 from the previous session continuity server. The new session continuity may also receive the applicable content quality threshold and applicable network condition threshold values associated with the new content duplication element from the session continuity server selection module 206. The new session continuity server may send an interim report to the LIG 104, while ensuring seamless handover of the user session. After receiving the last media and signaling content last sent to the LIG 104 from the previous session continuity server, the new session continuity server may check for missing content from the media and signaling content from the new content duplication element. After ensuring no lawful interception content leak, the new session continuity sever may inform the stability module 208. The stability module 208, may hence ensure lawful interception content duplication stability.

Post stabilization of the Law Interception (LI), the SCSC 102 may verify confirmation received from the SCS 120 and the content duplication element that the handover was successful respectively. If the confirmation is not received in a pre-defined time period, SCSC may repeat the selection of the new SCS and the new content duplication element.

Figure 3:
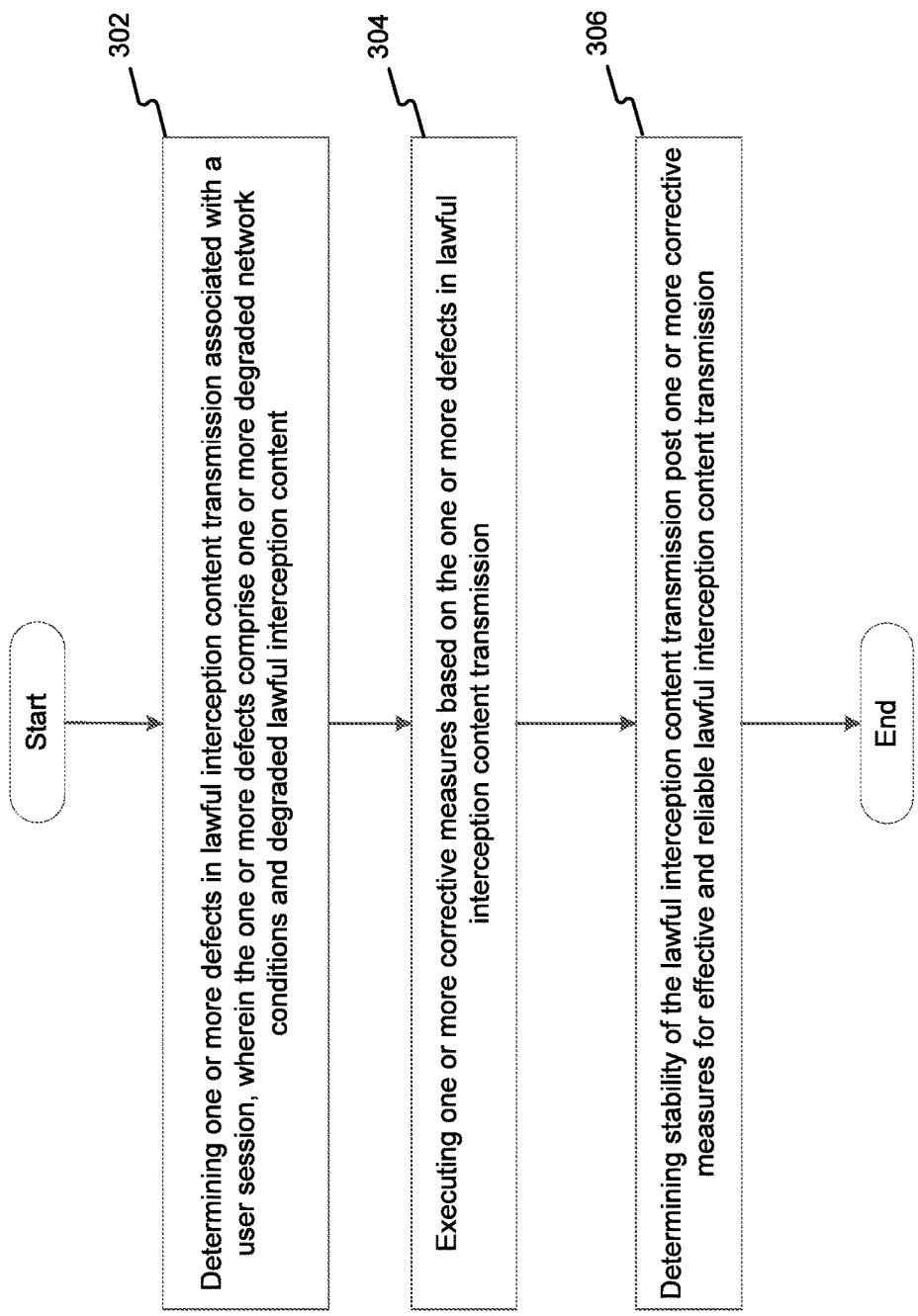
FIG. 3 illustrates an exemplary flow diagram of a method of reliable lawful interception content transmission across one or more networks.

FIG. 3 illustrates an exemplary flow diagram of a method of reliable lawful interception content transmission across one or more networks. The method may involve determining, by a session continuity server controller (SCSC) 102, one or more defects in lawful interception content transmission associated with a user session, wherein the one or more defects comprise one or more degraded network conditions and degraded lawful interception content at step 302. The defect detection module 202 may detect one or more degraded network conditions and degraded lawful interception content. The one or more degraded network conditions may lead to one or more defective LI events. The one or more defective lawful interception events may be missing SCS 120 heartbeat wherein the heartbeat is associated with the SCS 120 being active and functional, SCS 120 reporting failure of content duplication due to non-receipt of media and signaling content from a content duplication element, delay in reception of LI content, corruption of LI content during transmission.

The content duplication element may be one or more communication network elements capable of performing content duplication function. The one or more degraded network conditions may be due to increased congestion associated with one or more communication network and decreased processing capacity associated with the one or more communication network elements. The processing capacity may be associated with computing resources such memory, storage space and processor core occupancy. The one or more degraded network conditions are determined based on a pre-defined network condition threshold and an applicable network condition threshold. The pre-defined network condition threshold may be provisioned from LEA. The LEA may provision the pre-defined network condition threshold based on anticipated impact of the network conditions on LI continuity. For example Table A may illustrate processing capacity level threshold corresponding to procession and memory occupancy. Table B may illustrate congestion level threshold corresponding to congestion associated with the one or more communication network.

The applicable network condition threshold may be a threshold value associated with one or more degraded network conditions which needs to be maintained for effective and reliable lawful interception content transmission. The applicable network condition threshold (ANCT) may be determined based on correlation of historical congestion levels and historical processing capacity levels, with historical occurrence of the one or more defective LI events. For example, when processing capacity level may be 83% and congestion level may be 83% the one or more defective LI events may be recorded at 70 occurrences per minute. During at least one of lawful interception initiation or content duplication function handover, the defect detection module 202 may determine the applicable network condition threshold. Post initiation of lawful interception for one or more target users, the defect detection module 202 may receive congestion levels and processing capacity levels from the content duplication element and the session continuity server 120 if the applicable network condition threshold (ANCT) is crossed. During handover of the content duplication function the defect detection module 202 may receive network condition reports from the SCS 120. Upon receiving one or more network condition reports, the defect detection module 202 may confirm detection of one or more degraded network conditions.

The defect detection module 202 may determine degraded LI content based on a pre-defined content quality threshold actual network path length, Link Availability Factor, Link Quality Factor. The predefined content quality threshold (PCQT) may be determined based on number of headers frames, decryption time, data packet transmission delays and data packet retransmissions. The predefined content quality threshold may be provisioned by the LEA. The PCQT may be applicable to one or more communication network under jurisdiction of the LEA. The LEA may also provision a time interval for periodic check of content quality across the content duplication element and SCS 120. The periodic check of content quality may be indexed as content quality index (CQI). The time interval for periodic check may be in range of 2 to 5 minutes. The applicable content quality threshold (ACQT) may be associated with SCS 120 as well as the CDE. The SCS 120 and the CDE may determine separate ACQT associated with the degraded LI content. The ACQT may be associated with the CDE during lawful interception initiation. The ACQT may be associated with the SCS 120 during a handover of user session form the source network 106 to the destination communication network 110. The ACQT may be sent to the CDE during the lawful interception initiation by the SCSC 102. The ACQT may be sent to the SCS 120 by the SCSC 102, during a handover of user session form the source network 106 to the destination communication network 110. The ACQT may be determined based on pre-defined content quality threshold, actual network path length, link availability factor, link quality factor.

ACQT=BCQT*(Actual network path length for LI/Average path length or LI)*Link Availability Factor*Link Quality Factor The actual network path length may be at least one of physical distance between the content duplication element and the SCS 120 or physical distance between the LIG 104 and the SCS 120. The link availability factor may be at least one of status of connection between the content duplication element and the SCS 120 or status of connection between the LIG 104 and the SCS 120. The link quality factor may be associated with at least one of properties of physical channel between the content duplication element and the SCS 120 or properties of physical channel between the LIG 104 and the SCS 120.

For example, as given in Table C

Link Availability Factor may be equal to 1 if the link availability between SC server 120 and LIG 104 is greater than or equal to 99.999%. Link Availability Factor may be equal to 0.9 if the link availability between SC server 120 and LIG 104 is greater than or equal to 99% but less than 99.999%. Link Availability Factor may be equal to 0.7 if the link availability between SC server 120 and LIG 104 is greater than or equal to 90% and less 99%. Link Availability Factor may be equal to 0.5 if the link availability between SC server 120 and LIG 104 is greater than or equal to 80.0% but less than 90%. Link Availability Factor may be equal to 0.2 if the link availability between the SCS 120 and the LIG 104 is less than 80%. The link availability information may be provided by the LIG 104 and stored internally in the SCSC 102.

The link quality factor may be determined based on number of packets retransmissions per second due to packet corruption. For example as given in Table D, the number of retransmissions per second from the SCS 120 to the LIG 104 due to packet corruption may be provided by the LIG 104 to the SCSC 102. Let 'a' and 'b' be pre-configured range denoting the number of packets retransmission per second. The Link Quality Factor may be equal to 1 if number of retransmissions per second from the SCS 120 to the LIG 104 due to packet corruption is less than 'a'. The Link Quality Factor may be equal to 0.7, if number of retransmissions per second from the SCS 120 to LIG 104 due to packet corruption is greater than or equal to 'a', and less than 'b'. The Link Quality Factor may be equal to 0.3 if number of retransmissions per second from the SCS 120 to the LIG 104 due to packet corruption is greater than or equal to 'b'. So if the PCQT is 5 and actual network path length for LI/average path length for LI is 1.5, link availability factor is 1 and link quality factor is also 1 then the ACQT may be 7.5.

Once the ACQT is determined for the SCS 120 and the CDE, the SCSC 102 then may provide the respective ACQT values to the SCS 120 and the CDE. The SCSC 102 may provide a provisioned value for one or more 'observation windows' (OWS) which may be used by the CDE and the SCS 120 as explained below.

The CDE and the SCS 120 may dynamically compute the CQI periodically (e.g., once every 2 minutes), and may send a report to the SCSC 102 if the CQI value is lower than the ACQT value received from the SCSC 102 for OWS consecutive time intervals. The CQI is dynamically computed as follows, for e.g:

CQI=Header Index+Delay Index+Retransmission Index+Encryption Index

For example as given in Table E

Header Index may be equal to 1 if no internal transport or higher layer headers are present. Header Index may be equal to 0.7 if 1 or 2 internal transport or higher layer headers are present. Header Index may be equal to 0.4 if more than 2 internal transport or higher layer headers are present. Let 'x' and 'y' be pre-configured range in seconds denoting the round trip time (RTT) delay.

As given in Table F Delay Index may be equal to 1 if LI packet round trip delay is less than 'x' seconds. Delay Index may be equal to 0.7 if LI packet round trip delay is greater than 'x' seconds, but less than 'y' seconds. Delay Index may be equal to 0.4 if LI packet round trip delay is greater than 'y' seconds.

Let 'c' and 'd' be pre-configured range denoting the number of packet retransmission due to time out or packet drop. Let MF be a pre-configured Multiplication Factor.

Retransmission Index may be equal to 1, if number of retransmissions per second*MF is less than 'c'. Retransmission Index may be equal to 0.7, if number of retransmissions/second*MF is greater than or equal to 'c', but less than 'd'. Retransmission Index may be equal to 0.3, if number of retransmissions/second*MF is greater than or equal to 'd'.

Encryption Index may be equal to 1 if the one or more user session is unencrypted. Encryption Index may be equal to 1 if the one or more user session is encrypted but if no decryption is done at the CDE or SCS 120. Encryption Index may be equal to 0.9 if decryption is done at the CDE or SCS 120 and more than 40% of spare resources are available at the CDE or SCS 120 where the decryption is done. Encryption Index may be equal to 0.6 for all other cases.

So if Header Index is 1 and Delay Index is 1 and Retransmission Index is 1 and Encryption Index is 1, then CQI may be 4.

Once the CQI is determined, the CQI may be compared with the ACQT. If the CQI value is lower than the CQT value received from the SCSC for periodic check for OWS consecutive observation windows, the quality of the lawful interception content may be considered as degraded.

Once the one or more defects are detected, one or more corrective measures may be executed by the session continuity server controller 102 at step 304, based on the one or more defects in lawful interception content transmission. The one or more corrective measures may comprise at least one of selection of a new content duplication element and selection of a new session continuity server. The selection of the new content duplication element may be determined based on content duplication element action level (CDEAL). The CDEAL may be determined based on processing capacity associated with the content duplication element and congestion level associated with the content duplication element.

Content Duplication Element Action
Level=Processing Capacity+Congestion Level

Congestion level associated with the content duplication element may be reported to SCSC 102 by the one or more communication network. The processing capacity associated with content duplication element may be reported to the SCSC 102 by the one or more communication network. Based on the content duplication element action level, a content duplication element selection module 204, may determine selection of the new content duplication element. For example as given in Table G, If the CDEAL is 0, the content duplication element may not change. If the CDEAL is between or equal to 1 or 2, the content duplication element may not change for a user session, but the content duplication element may not be used for more than a pre-defined number of new or additional user sessions. If the CDEAL is 3, the content duplication element may not change for the present user session, but the content duplication element may not be selected for any new or additional user sessions. If the CDEAL is above 3, then a new content duplication function may be selected for the ongoing user session. The new content duplication element may be selected only if following conditions are met: one or more degraded network conditions don't exist across more than 50% of one or more content duplication element and the new content duplication element was not selected for a user session for a preconfigured "m" seconds due to one or more degraded network conditions across the one or more content duplication elements. In an exemplary embodiment, the content duplication element selection module 204 may select the new content duplication element for "i" user sessions. The number of user sessions 'i' may be determined by the actual load level, based on processing capacity and congestion level associated with the new content duplication element. For example $$i = \frac{\text{Maximum [(Congestion level} - 85\%), 1]}{\text{[processing capacity per target user for Lawful Interception]}}$$

The degradation in the LI content may be detected by the defect detection module 202 The SCSC controller 102 may then check one or more reasons for LI content degradation. The number of retransmissions or delay in transmission of LI content packets may have exceeded the Content Quality Threshold. The SCSC 120 may determine last computed content duplication element action level. For example, if the CDEAL is less than 2 no action is taken by the SCSC 120, if the CDEAL is greater than or equals to 2 the new content duplication element may be selected. The new content duplication element may be selected only if following conditions are met: one or more degraded network conditions don't exist across more than 50% of one or more content duplication element and the new content duplication element was not selected for a user session for a preconfigured "m" seconds due to one or more degraded network conditions across the one or more content duplication elements. If the new content duplication element doesn't comply with the content duplication format or session characteristics of the one or more user sessions provisioned by the LEA, then content duplication element selection module 204 may select an appropriate content duplication element to comply with the content duplication format or session characteristics provisioned by the LEA.

If a timeout occurs before a confirmation is received from the SCS 120 that the content duplication element handover was successful, or if a failure indication is received from the SCS 120 for the content duplication element handover then the content duplication element may not be selected in future for lawful interception content duplication.

After selecting a new content duplication element, the content duplication element selection module 204 may trigger the defect detection module 202 for determining the applicable content quality threshold and applicable network condition threshold values associated with the new content duplication element. The content duplication element selection module 204, then may update the SCS 120 with the applicable content quality threshold and applicable network condition threshold values associated with the new content duplication element. Upon receiving the applicable content quality threshold and applicable network condition threshold values associated with the new content duplication element, the SCS 120 may instruct content duplication function hand over to the new content duplication element, and also pass the applicable content quality threshold and applicable network condition threshold values to the new content duplication element.

The one or more corrective measures may comprise at least one of selection of a new content duplication element and selection of a new session continuity server, SCS 102. The selection of the new SCS 120, may be based on session continuity server action level (SCSAL). The SCSAL may be determined based on processing capacity associated with the session continuity server 120 and congestion level associated with the session continuity server 120.

SCS Action Level=Processing Capacity Level+Congestion Level

Congestion level associated with the session continuity server (SCS) 120 and the processing capacity associated with the session continuity server (SCS) 120 may be reported to SCSC 102 by the one or more communication network. Based on the SCSAL, a session continuity server selection module 206, may determine selection of the new SCS 120. For example as given in Table H, if the SCSAL is 0 or less than 1, then no action may be required. If the SCSAL is between 1 to 2, the new SCS 120 may not be selected, but the previous SCS 120 is not selected for more than a pre-defined number of new or additional user sessions. If the SCSAL is 3, the SCS 120 may not change for the present user session, but may not be selected for any new or additional user sessions. If the SCSAL is above, then the new SCS 120 may be selected for the ongoing user session. The new SCS 120 may be selected only if: one or more degraded network conditions don't exist across more than 50% of one or more SCS and the new SCS was not selected for a user session for a preconfigured "r" seconds due to one or more degraded network conditions across the one or more content duplication elements. In an exemplary embodiment "r" can be based on a pre-configured value that is dynamically adjusted by the SCSC 102 depending on the distance between SCS 120 and SCSC 102, and the network congestion level. In an exemplary embodiment, the session continuity server selection module 206 may select the new SCS for "k" user sessions. The number of user sessions 'k' may be determined by the actual load level, based on processing capacity and congestion level associated with the new SCS. For example $$k = \frac{\text{Maximum [(Congestion level} - 85\%), 1]}{\text{[processing capacity per target user for Lawful Interception]}}$$

The degradation of LI content may be detected by the defect detection module 202. Then the SCSC controller 102 may check one or more reasons for LI content degradation. The number of retransmissions or delay in transmission of LI content packets may have exceeded Content Quality Threshold. The SCSC 120 may determine last computed SCSAL. For example, if the SCSAL is less than 2 no action is taken by the SCSC 120, If the SCSAL is greater than or equals to 2 the new session continuity server may be selected. If the new SCS doesn't comply with the content duplication format or session characteristics of the one or more user sessions provisioned by the LEA, then session continuity server selection module 206 may select an appropriate SCS to comply with the content duplication format or session characteristics provisioned by the LEA.

The selection of the new SCS may be triggered, when SCS heartbeat is missed by the SCSC 102. The defect detection module 202 may detect the SCS heartbeat periodically. If a timeout occurs before a confirmation is received from a new SCS that a session continuity server handover was successful, or if a failure indication is received from the new SCS for the session continuity server handover then the session continuity server may not be selected in future for lawful interception.

After selecting a new session continuity server, the session continuity server selection module 206 may trigger the defect detection module 202 for determining the applicable content quality threshold and the applicable network condition threshold values associated with the new session continuity server. The session continuity server selection module 206, may update the new SCS 102 with the applicable content quality threshold and applicable network condition threshold values associated with the new SCS.

After executing the one or more corrective measures, the session continuity server controller 102 may determine stability of the lawful interception content transmission at step 304. Post the handover of content duplication element and session continuity server SCS 120, the stability module 208 may ensure stability of the lawful interception content transmission. The stability module 208 may ensure that the Lawful interception is seamlessly continued after executing one or more corrective measure.

The stability module 208 may ensure that the new content duplication element and the previous session continuity server exchange media and signaling information associated with the lawful interception content transmission to ensure Lawful Interception is seamless. The SCSC may inform the SCS 120 regarding the selection of the new content duplication element. The SCS 120 may send instructions to the previous content duplication element for lawful interception content duplication function handover. As part of the content duplication function handover process, the SCS server 120 may instruct the new content duplication element to initiate Lawful Interception for the target user. The stability module 208 may wait for a pre-configured time period to receive a confirmation message from the SCS that the system has reached a stable state.

The stability module 208 may ensure that the new session continuity server and the previous session continuity server exchange media and signaling information associated with the lawful interception content transmission to ensure Lawful Interception is seamless. The stability module 208 may, inform the previous session continuity server about the session continuity server handover. Upon receiving the information, the previous session continuity server may mark last signaling and media content sent to LIG 104. The stability module 208 may, inform the previous session continuity server about the session continuity server handover. Upon receiving the information, the new session continuity server may initiate receiving media and signaling content from the new content duplication element. The new session continuity server may also receive the media and signaling content last sent to the LIG 104 from the previous session continuity server. The new session continuity may also receive the applicable content quality threshold and applicable network condition threshold values associated with the new content duplication element from the session continuity server selection module 206. The new session continuity server may send an interim report to the LIG 104, while ensuring seamless handover of the user session. After receiving the last media and signaling content last sent to the LIG 104 from the previous session continuity server, the new session continuity server may check for missing content from the media and signaling content from the new content duplication element. After ensuring no lawful interception content leak, the new session continuity sever may inform the stability module 208. The stability module 208, may hence ensure lawful interception content duplication stability.

Post stabilization of the Law Interception (LI), the SCSC 102 may verify confirmation received from the SCS 120 and the content duplication element that the handover was successful respectively. If the confirmation is not received in a pre-defined time period, SCSC 102 may repeat the selection of the new SCS and the new content duplication element.

Computer System

FIG. 4 is a block diagram of an exemplary computer system for implementing embodiments consistent with the present disclosure. Variations of computer system 401 may be used for implementing list all computers from other figures. Computer system 401 may comprise a central processing unit ("CPU" or "processor") 402. Processor 402 may comprise at least one data processor for executing program components for executing user- or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 402 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 402 may be disposed in communication with one or more input/output (I/O) devices via I/O interface 403. The I/O interface 403 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 403, the computer system 401 may communicate with one or more I/O devices. For example, the input device 404 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 405 may be a printer, fax machine, video display (e.g., cathode ray tube (CRT), liquid crystal display (LCD), light-emitting diode (LED), plasma, or the like), audio speaker, etc. In some embodiments, a transceiver 406 may be disposed in connection with the processor 402. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 402 may be disposed in communication with a communication network Error! Reference source not found.08 via a network interface 407. The network interface 407 may communicate with the communication network 408. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 408 may include, without limitation, a direct interconnection, local area network (LAN), wide area network (WAN), wireless network (e.g., using Wireless Application Protocol), the Internet, etc. Using the network interface 407 and the communication network Error! Reference source not found.08, the computer system 401 may communicate with devices 410, 411, and 412. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 401 may itself embody one or more of these devices.

In some embodiments, the processor 402 may be disposed in communication with one or more memory devices (e.g., RAM 413, ROM 414, etc.) via a storage interface 412. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 416, user interface application 417, web browser 418, mail server 419, mail client 420, user/application data 421 (e.g., any data variables or data records discussed in this disclosure), etc. The operating system 416 may facilitate resource management and operation of the computer system 401. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 417 may facilitate display, execution, interaction, manipulation, or operation of program components through textual or graphical facilities. For example, user interfaces may provide computer interaction interface elements on a display system operatively connected to the computer system 401, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 401 may implement a web browser 418 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 401 may implement a mail server 419 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 401 may implement a mail client 420 stored program component. The mail client may be a mail viewing application, such as Apple Mail, Microsoft Entourage, Microsoft Outlook, Mozilla Thunderbird, etc.

In some embodiments, computer system 401 may store user/application data 421, such as the data, variables, records, etc. (e.g., list here) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The specification has described System and Method for effective and reliable LI content transmission across networks. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for optimizing lawful interception content transmission across one or more networks, the method comprising:
   determining, by a session continuity computing device, one or more defects in lawful interception content transmission associated with a user session, wherein the one or more defects comprise one or more degraded network conditions and degraded lawful interception content;
   executing, by the session continuity computing device, one or more corrective measures based on the one or more defects in lawful interception content transmission, wherein the one or more corrective measures comprises:
selecting a new content duplication element that complies with a content duplication format of an ongoing user session when the new content duplication element is not selected for one or more user sessions for a preconfigured time in response to the one or more degraded network conditions across one or more content duplication elements, wherein selecting the new content duplication element is performed in response to non-receipt of media and signalling content from a current content duplication element; and
performing a handover of the ongoing user session from the current content duplication element to the new content duplication element when a confirmation is received before a timeout occurs; and
determining, by the session continuity computing device, a stability parameter of the lawful interception content transmission based on the one or more corrective measures to optimize lawful interception content transmission.

2. The method of claim 1, wherein the one or more degraded network conditions are determined based on a pre-defined network condition threshold and an applicable network condition threshold.

3. The method of claim 2, wherein the applicable network condition threshold is determined based on a correlation of historical congestion levels and historical processing capacity levels associated with the current content duplication element with historical occurrence of the one or more defects, wherein each content duplication element is a network element capable of performing content duplication.

4. The method of claim 1, wherein the one or more defects in lawful interception content transmission is determined based on a pre-defined content quality threshold, an actual network path length, a link availability factor, or a link quality factor.

5. The method of claim 4, wherein the pre-defined content quality threshold is determined based on a number of headers frames, a decryption time, data packet transmission delays, and data packet retransmissions.

6. The method of claim 1, wherein the one or more corrective measures further comprises selection of a new session continuity computing device.

7. The method of claim 1, wherein the one or more corrective measures comprises selection of the new content duplication element, for the ongoing user session and for a pre-defined number of subsequent user sessions, when a content duplication element action level determined based on a processing capacity associated with the content duplication element and a congestion level associated with the content duplication element exceeds a pre-defined threshold, and wherein the pre-defined number of subsequent user sessions are determined based on an actual load level, a processing capacity and a congestion level associated with the new content duplication element.

8. The method of claim 4, wherein the link quality factor is determined based on a number of packets retransmissions per second due to packet corruption between a lawful interception gateway and a session continuity server, and wherein the link availability factor is based on at least one of a status of connection between the content duplication element and the session continuity server or a status of connection between the lawful interception gateway and the session continuity server.

9. A session continuity computing device comprising a processor and a memory coupled to the processor which is configured to be capable of executing programmed instructions comprising and stored in the memory to:
determine one or more defects in lawful interception content transmission associated with a user session, wherein the one or more defects comprise one or more degraded network conditions and degraded lawful interception content;
execute one or more corrective measures based on the one or more defects in lawful interception content transmission, wherein the one or more corrective measures comprises:
selecting a new content duplication element that complies with a content duplication format of an ongoing user session when the new content duplication element is not selected for one or more user sessions for a preconfigured time in response to the one or more degraded network conditions across one or more content duplication elements, wherein selecting the new content duplication element is performed in response to non-receipt of media and signalling content from a current content duplication element; and
performing a handover of the ongoing user session from the current content duplication element to the new content duplication element when a confirmation is received before a timeout occurs; and
determine a stability parameter of the lawful interception content transmission based on the one or more corrective measures to optimize lawful interception content transmission.

10. The device of claim 9, wherein the one or more degraded network conditions are determined based on a pre-defined network condition threshold and an applicable network condition threshold.

11. The device of claim 10, wherein the applicable network condition threshold is determined based on a correlation of historical congestion levels and historical processing capacity levels associated with the current content duplication element with historical occurrence of the one or more defects, wherein each content duplication element is a network element capable of performing content duplication.

12. The device of claim 9, wherein the one or more defects in lawful interception content transmission is determined based on a pre-defined content quality threshold, an actual network path length, a link availability factor, or a link quality factor.

13. The device of claim 12, wherein the pre-defined content quality threshold is determined based on a number of headers frames, a decryption time, data packet transmission delays, and data packet retransmissions.

14. The device of claim 9, wherein the one or more corrective measures further comprises selection of a new session continuity computing device.

15. A non-transitory computer readable medium having stored thereon instructions for optimizing lawful interception content transmission across one or more networks comprising executable code which when executed by a processor, causes the processor to perform steps comprising:
determining one or more defects in lawful interception content transmission associated with a user session, wherein the one or more defects comprise one or more degraded network conditions and degraded lawful interception content;

executing one or more corrective measures based on the one or more defects in lawful interception content transmission, wherein the one or more corrective measures comprises:
  selecting a new content duplication element that complies with a content duplication format of an ongoing user session when the new content duplication element is not selected for one or more user sessions for a preconfigured time in response to the one or more degraded network conditions across one or more content duplication elements, wherein selecting the new content duplication element is performed in response to non-receipt of media and signalling content from a current content duplication element; and
  performing a handover of the ongoing user session from the current content duplication element to the new content duplication element when a confirmation is received before a timeout occurs; and
determining a stability parameter of the lawful interception content transmission based on the one or more corrective measures to optimize lawful interception content transmission.

16. The medium of claim 15, wherein the one or more degraded network conditions are determined based on a pre-defined network condition threshold and an applicable network condition threshold.

17. The medium of claim 16, wherein the applicable network condition threshold is determined based on a correlation of historical congestion levels and historical processing capacity levels associated with the current content duplication element with historical occurrence of the one or more defects, wherein each content duplication element is a network element capable of performing content duplication.

18. The medium of claim 15, wherein the one or more defects in lawful interception content transmission is determined based on a pre-defined content quality threshold, an actual network path length, a link availability factor, or a link quality factor.

19. The medium of claim 18, wherein the pre-defined content quality threshold is determined based on a number of headers frames, a decryption time, data packet transmission delays, and data packet retransmissions.

20. The medium of claim 15, wherein the one or more corrective measures further comprises selection of a new session continuity computing device.

* * * * *